United States Patent
Liu et al.

(10) Patent No.: US 12,393,962 B2
(45) Date of Patent: Aug. 19, 2025

(54) SYSTEM INTEGRATION USING AN ABSTRACTION LAYER

(71) Applicant: eBay Inc., San Jose, CA (US)

(72) Inventors: Yi Liu, Shanghai (CN); Qingyu Ji, Shanghai (CN); Sizhong Liu, Shanghai (CN); Chinmaya Dubey, Seattle, WA (US); Bin Li, Shanghai (CN); Peijun Xu, Shanghai (CN); Mustafa Attiqullah, Bothell, WA (US)

(73) Assignee: eBay Inc., San Jose, CA (US)

( * ) Notice: Subject to any disclaimer, the term of this patent is extended or adjusted under 35 U.S.C. 154(b) by 57 days.

(21) Appl. No.: 18/553,492

(22) PCT Filed: Mar. 31, 2021

(86) PCT No.: PCT/CN2021/084591
§ 371 (c)(1),
(2) Date: Sep. 29, 2023

(87) PCT Pub. No.: WO2022/205139
PCT Pub. Date: Oct. 6, 2022

(65) Prior Publication Data
US 2024/0185288 A1    Jun. 6, 2024

(51) Int. Cl.
*G06Q 30/0242*    (2023.01)
(52) U.S. Cl.
CPC ............................. *G06Q 30/0242* (2013.01)
(58) Field of Classification Search
CPC ................ G06Q 30/0242; G06Q 30/0275
See application file for complete search history.

(56) References Cited

U.S. PATENT DOCUMENTS

2008/0319856 A1* 12/2008 Zito .................. G06Q 30/02
                                                            715/716
2009/0164300 A1    6/2009 Gupta et al.
(Continued)

FOREIGN PATENT DOCUMENTS

| CN | 101431651 A | 5/2009 |
| CN | 101627404 A | 1/2010 |

OTHER PUBLICATIONS

Don Batory and Sean O'Malley. 1992. The design and implementation of hierarchical software systems with reusable components. ACM Trans. Softw. Eng. Methodol. 1, 4 (Oct. 1992), 355-398. https://doi.org/10.1145/136586.136587 (Year: 1992).*

(Continued)

*Primary Examiner* — Waseem Ashraf
*Assistant Examiner* — Christopher C Busch
(74) *Attorney, Agent, or Firm* — Shook, Hardy & Bacon L.L.P.

(57) ABSTRACT

A system for integrating various different advertisement platforms using different advertisement channels includes generating a logic campaign in an abstract layer. A basic unit is defined in the abstract layer by abstracting aspects of different advertisement campaign structures. The basic unit can be common among different advertisement structures for different advertisement channels. The advertisement structures are replicated by duplicating the structure and changing an advertising element node option associated with at least one advertisement element node of the replicated structure. The logic campaigns are generated from the advertisement element node options of corresponding advertisement element nodes. The logic campaign is associated with a physical campaign of a physical layer, which is employed by the advertisement platform. Thus, modification made to the basic unit in the abstract layer can implement (Continued)

changes to the physical campaigns of any of the different advertisement platforms of the physical layer.

20 Claims, 8 Drawing Sheets

(56) References Cited

U.S. PATENT DOCUMENTS

2013/0219427 A1    8/2013  Zundel et al.
2020/0346114 A1*  11/2020  Verma .................... A63F 13/53

OTHER PUBLICATIONS

International Search Report issued in International Application No. PCT/CN2021/084591, mailed Dec. 29, 2023 (3 pages).
Written Opinion issued in International Application No. PCT/CN2021/084591, mailed Dec. 29, 2023 (4 pages).
International Preliminary Report on Patentability received for PCT Patent Application No. PCT/CN2021/084591, mailed on Oct. 12, 2023, 6 pages.

* cited by examiner

SYSTEM INTEGRATION USING AN ABSTRACTION LAYER

BACKGROUND OF THE INVENTION

Various companies host platforms that assist partners with interacting with the company. For instance, many of the companies host a web-based portal that allows partners to engage the company and to transmit information to the company that may be needed for the company to provide the partner with a service. These web-based platforms are generally designed by each company for this purpose, but because they are designed separately, each platform has different requirements and different physical structures.

SUMMARY OF THE INVENTION

At a high level, the technology relates to integrating computer systems that use different features to perform their designed functions. In particular, the technology relates to solving integration problems between systems of advertisement platforms.

An example includes abstracting channel specific advertisement features of an advertisement channel, such as advertisement channels using PLA (product listing ads), text, and social ads. To abstract these features, which can be different based on the advertisement channel, a basic unit is defined in an abstract layer of a computer program. The basic unit correlates to each of the channel specific features, even where the channel specific features are different. As such, the basic unit can be common among a plurality of advertisement channels.

In general, the advertisement channels comprise advertisement structures that are determined based on advertisement element nodes. The advertisement element nodes can represent variables of an advertisement that can be adjusted, and are correlated to the basic unit. Channel specific features can be represented as advertisement element nodes for a specific channel, and advertisement element nodes represent a variable for advertisement element nodes options. For instance, an advertisement element node might represent advertisement delivery to different devices, which could include desktops, mobile, and tablet devices as advertisement element nodes options.

Within the abstract layer, an advertisement structure is replicated relative to at least one advertisement element node. That is the advertisement structure can be duplicated and the advertisement element node option for the at least one advertisement element nodes is changed. This can be done through all of the advertisement element nodes options, and might also be done for each of the advertisement element nodes or for each of the advertisement structures of the plurality of advertisement channels.

Logic campaign, or a logical advertisement campaign within the abstract layer, can be generated using the advertisement element node options of corresponding advertisement element nodes. That is, the advertisement structure can be represented as a tree structure of advertisement element node options, and the logic campaign generated at the base of the tree structure, where each of the advertisement element nodes connected to the logic campaign from the base to the top of the tree are corresponding advertisement element nodes. The tree may also include segmentation nodes, and segments associated with the segmentation nodes can also be included in the logic campaign.

The logic campaign can be associated with a physical campaign of a physical layer of another computer program. The physical layer can be associated with the advertisement platform, and thus, when the basic unit is modified, a change is made to the physical layer of the advertisement platform. Through the replication, various logic campaigns are generated that correspond and can be associated with the different advertisement channels, even those having different channel specific features. By modifying the basic unit, changes can be made, or pushed, to each of the platforms for these different channels.

This summary is intended to introduce a selection of concepts in a simplified form that is further described in the Detailed Description section of this disclosure. The Summary is not intended to identify key or essential features of the claimed subject matter, nor is it intended to be used as an aid in determining the scope of the claimed subject matter. Additional objects, advantages, and novel features of the technology will be set forth in part in the description which follows, and in part will become apparent to those skilled in the art upon examination of the disclosure or learned through practice of the technology.

BRIEF DESCRIPTION OF THE DRAWING

The present technology is described in detail below with reference to the attached drawing figures, wherein.

DETAILED DESCRIPTION OF THE INVENTION

Figure 1:
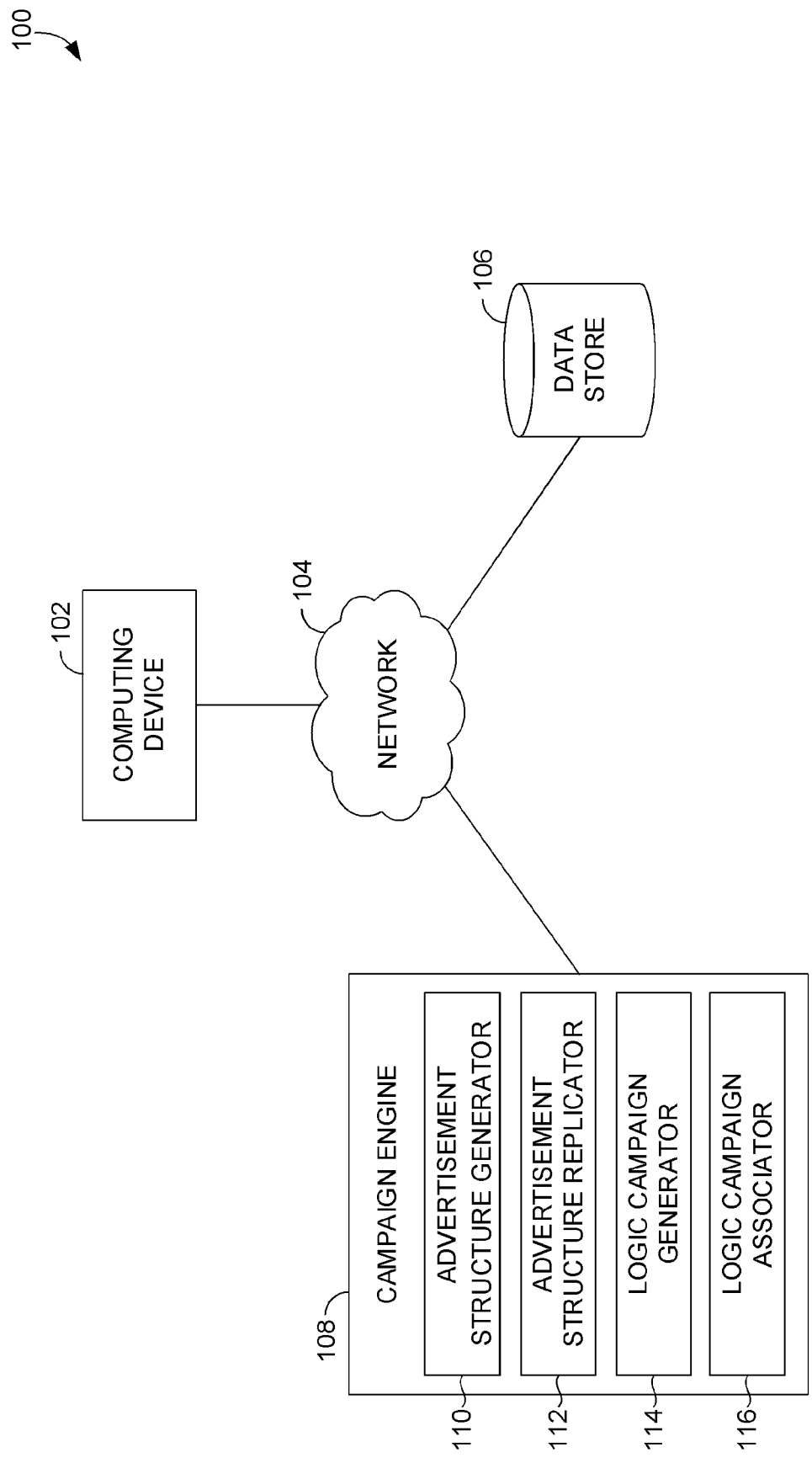
FIG. 1 is an example operating environment comprising a campaign engine, in accordance with an embodiment described herein.

Computer system integration is necessary across many different platform types. Many software platforms are developed independently and by separate hosts, and each serves a different purposes specific to the host that developed it. Many of these platforms are generally built for interaction with external partners. Thus, for an entity that is interacting with different partners having different host platforms, without some sort of system integration, they are relegated to engaging each of the different platforms individually and interacting with each of the different platforms in a manner that complies only with the platform. In many cases, this requires modification to the software on the client side to be able to interact with the partner's software platform. Thus, in many cases, different software programs must be written and maintained to interact with the different platforms.

Because of this, the field of system integration, for instance, the building of central management services, is constantly evolving as existing host platforms are updated and new host platforms with different requirements are added. New technologies and computer engineering advances are needed to integrate such systems and maintain their integration.

Within system integration, different services fields have different problems and challenges with integration. For instance, in the field of telecommunications has vastly different challenges than integrating system in the field of banking. Thus, many of the solutions only work in the field in which they are designed to solve problems.

The technology involved in advertising is no exception, and poses particular technical challenges when attempting to integrate different advertisement systems or design programs that work with different advertisement systems. Like other areas, online advertising companies have developed different advertising platforms. Traditionally, when clients interact with these different platforms, they code different software to interact with each system or they engage a middleman to manually configure an advertisement campaign to be compatible with various different advertising platforms of the client's partners, which generally involved recoding the advertisement campaign or translating various aspects of the advertisement campaign to comport with the software platform hosted by the partner.

This problem, however, is not simply solved by a human effort to bring an advertisement campaign into compliance with different host platforms because there are also some problems unique to advertising in the online space. In particular, some client websites that wish to engage advertising partners host billions of items. It is impossible to design a campaign for each of these items. The problem is further compounded when you include even just one variable, such as whether the advertisement campaign is delivered on a desktop computer, tablet, or a mobile device, because different campaigns might be designed for each device type for each of the potentially billon items. Beyond this, add an extra dimension of keywords to the mix, and the possibilities go beyond even computational ability, as one large online marketplace uses more than 600 Million keywords in item searching. Because of these problems, many campaigns that have been designed are not even able to be translated in such a way as to be compatible with the various advertisement platforms.

The technology of this disclosure helps solves some of these problems. In particular, a logic campaign can be designed within an abstract layer and pushed to a physical layer of the advertisement platforms for implementation. By implementing the technology in a separate abstract layer dimension from the physical layer dimension of the advertisement platforms or software communicating to the advertisement platform, modifications can be made to the abstract layer that cause the desired action or change in the physical layer.

That is, within the abstract layer, an advertisement structure can be generated that, in some cases, reflects the features of the advertisement platform of the physical layer. By defining a basic unit that correlates to aspects of different advertisement structures, a modification to the basic unit can cause a corresponding modification in the logic campaigns generated from the different advertisement structures. The logic campaigns are associated with the physical campaigns of the physical layer and thus cause a corresponding modification to the physical layer. By building the system abstract from the physical layer and defining common basic units, the change to the basic unit effects changes throughout different physical campaigns of the physical layer, including within systems that define different aspects that would generally require some translation, or different system integration code or technique. This provides a single platform by which each of the advertisement platforms can be engaged and used, without the need to engage each individually with different technical requirements. Further, such a management system in the space of advertisement platforms has been needed for a long time, as one of the main ways to overcome these problems is to use a manual intermediary in this industry. Moreover, the use of the abstract layer for replicating the advertisement structures having advertisement element nodes corresponding to a basic unit has not been commonly or routinely performed in this field.

One example method that provides many of these benefits includes defining a basic unit in an abstract layer. The abstract layer may be a layer of a computer program that is separate from a physical layer comprising other computer programs for the host advertisement platforms.

The basic unit abstracts aspects of the advertisement platforms. That is, each of the advertisement platforms includes features that are relevant to the operation of that platform and the operation of the advertisement channels provided by the advertisement platform. For instance, a common search engine website can act as an advertisement platform, by providing advertisements to users engaging the website, and the platform may provide different advertisement channels having different advertisement types, such as PLA, text, social, and so forth.

The basic unit can be defined to be common different advertisement channels, including advertisement channels of different types. The advertisement channels may each include an advertisement structure that is determined based on advertisement element nodes within the structure. For example, an advertisement channel for PLA might include options for delivering an advertisement on different devices, such as desktop computers, mobile devices, tablets, and the like. It might also include options for item and item group, such as what item is provided in the ad and from which item group. It could also include options for the audience, or who sees the advertisement and in what location. These are just examples, and other examples will be provided throughout the description.

Each of these options, which may be referred to as advertisement element node options, may be collectively represented by an advertisement element node. These different nodes make up the structure of the advertisement channel. It will be then be understood that different advertisement channels may have different advertisement structures, including different advertisement channels within the same advertisement platform or hosted by the same partner.

The bid unit can be defined to correlate to these advertisement element nodes. In this way, when a value of the bid unit changes, there is a corresponding change to the item element node or the item element node option for the item element node. Multipliers can be included in the correlation based on the item element node option. For instance, an advertisement delivered to a mobile device may cost more than an advertisement delivered to a desktop computer. As such, there can be a multiplier applied for one or more of the advertisement element node options to standardize this difference.

The advertisement structure can be replicated in the abstract layer, and the replication may be relative to one or more advertisement element nodes of the structure. That is, the advertisement element node structure can be duplicated, and at least one of the item element nodes options is modified for the replication. This may continue across all advertisement element nodes and for each of the advertisement channels.

For the advertisement structures, including the replicated advertisement structures, logic campaigns are created. The logic campaigns are also created in the abstract layer and reflect a physical campaign that can be designed in the physical layer that includes the system of the advertisement platform. The logic campaigns may comprise an advertisement element node option for each of the corresponding advertisement element nodes related to it in the advertisement structure. That is, the advertisement element structure can include multiple advertisement element nodes, each with multiple advertisement element node options. During replication, a structure is created that can include a combination of these advertisement element node options for various item element nodes. The logic campaign is generated at a point on the structure and corresponds to one or more of the advertisement element nodes based on the structure. In doing so, the logic campaign can be generated to comprise each of the advertisement element node options for the corresponding advertisement element nodes of the structure. As such, when employed, the system may generate multiple logic campaigns based on the replicated structures.

In some implementations, advertisement element nodes are segmented. Said differently, the advertisement element node option might be segmented into logical categories based on the advertisement element node option. For instance, an audience might be segmented based on geography, by income level, and other logical categories. When segmented, segmentation nodes can be added to the advertisement structure to illustrate the segmentation. In some case, the logical campaign will comprise the segments of corresponding segment nodes that are in a relationship with the logical campaign based on the advertisement structure.

The logical campaigns can be associated with a physical campaign of the physical layer. Put differently, the logical campaigns can be provided as associated with a physical campaign of the physical layer. The physical campaign may comprise options that correspond to the advertisement element node options of the logical campaign. The physical campaign may comply with aspects of an advertisement platform that implements the physical campaign based on the options. Because the options of the physical campaign are associated with the advertisement element options from which the logical campaign is generated, changes or modification to the logical campaign can cause changes in the physical campaign.

As noted, the basic unit is correlated to the advertisement element nodes. By modifying the basic unit, the advertisement element nodes options are changed, thereby modifying the logical campaigns. The logical campaigns, based on the replication, includes logical campaigns that are compatible with different advertisement channels and different advertisement platforms. Thus, the changes to the logical campaigns effect changes to the physical campaign based on the association by pushing the logical campaign to the physical layer via the association. For instance, the logical campaign can be communicated to an advertisement platform for implementation by the advertisement platform at the physical layer. In this way, various different advertisement platforms can employ corresponding logical campaigns. As opposed to engaging each advertisement platform individually and designing a physical campaign, the basic units of the abstract layer are modified, thus providing the appropriate modification to each different advertisement platform based on the logical campaign and its association to the physical campaign implemented by the advertisement platform.

It will be realized that the method just described is only an example that can be practiced from the description that follows, and it is provided to more easily understand the technology and recognize its benefits. Additional examples are now described with reference to the figures.

Turning now to FIG. 1, FIG. 1 illustrates an example operating environment 100 comprising campaign engine 108, in which implementations of the present disclosure may be employed. In particular, FIG. 1 illustrates a high-level architecture of operating environment 100 having components in accordance with implementations of the present disclosure. The components and architecture of FIG. 1 are intended as examples.

Among other components or engines not shown, operating environment 100 includes computing device 102. Computing device 102 is shown communicating using network 104 to data store 106 and campaign engine 108.

Network 104 may include one or more networks (e.g., public network or virtual private network "VPN") as shown with network 104. Network 104 may include, without limitation, one or more local area networks (LANs), wide area networks (WANs), or any other communication network or method.

In general, computing device 102 may be a device that corresponds to the computing device 700 described with reference to FIG. 7. In implementations, computing device 102 may be a client-side or front-end device, while in other implementations computing device 102 represents a back-end or server-side device. As will be discussed, computing device 102 may also represent one more computing devices, and as such, some variations of the technology comprise both a client-side or front-end device, and a back-end or server-side computing device performing functions that will be further described.

Operating environment 100 comprises data store 106. Data store 106 generally stores information including data, computer instructions (e.g., software program instructions, routines, or services), or models used in embodiments of the described technologies. Although depicted as a single database component, data store 106 may be embodied as one or more data stores or may be in the cloud.

As illustrated, operating environment 100 also includes campaign engine 108. In general, campaign engine 108 is suitable for generating logic campaigns within an abstract layer provided by a software program. The example campaign engine 108 comprises advertisement structure generator 110, advertisement structure replicator 112, logic campaign generator 114, and logic campaign associator 116, which will each be described in more detail.

Having identified various components of operating environment 100, it is noted and again emphasized that additional or fewer components, in any arrangement, may be employed to achieve the desired functionality within the scope of the present disclosure. Although the various components of FIG. 1 are shown with lines for the sake of clarity, in reality, delineating various components is not so clear, and metaphorically, the lines may more accurately be grey or fuzzy. Although some components of FIG. 1 are depicted as single components, the depictions are intended as examples in nature and in number and are not to be construed as limiting for all implementations of the present disclosure. The functionality of operating environment 100 can be further described based on the functionality and features of the previously listed components. Other arrangements and elements (e.g., machines, interfaces, functions, orders, and groupings of functions, etc.) can be used in addition to or instead of those shown, and some elements may be omitted altogether.

Further, many of the elements described in relation to FIG. 1, such as those described in relation to campaign engine 108, are functional entities that may be implemented as discrete or distributed components or in conjunction with other components, and in any suitable combination and location. Various functions described herein are being performed by one or more entities and may be carried out by hardware, firmware, or software. For instance, various functions may be carried out by a processor executing computer-executable instructions stored in memory. Moreover, the functions described in relation to FIG. 1 may be performed by computing device 102 at either the front-end, client-side or the back-end, server-side, in any combination of functions.

Figure 2:
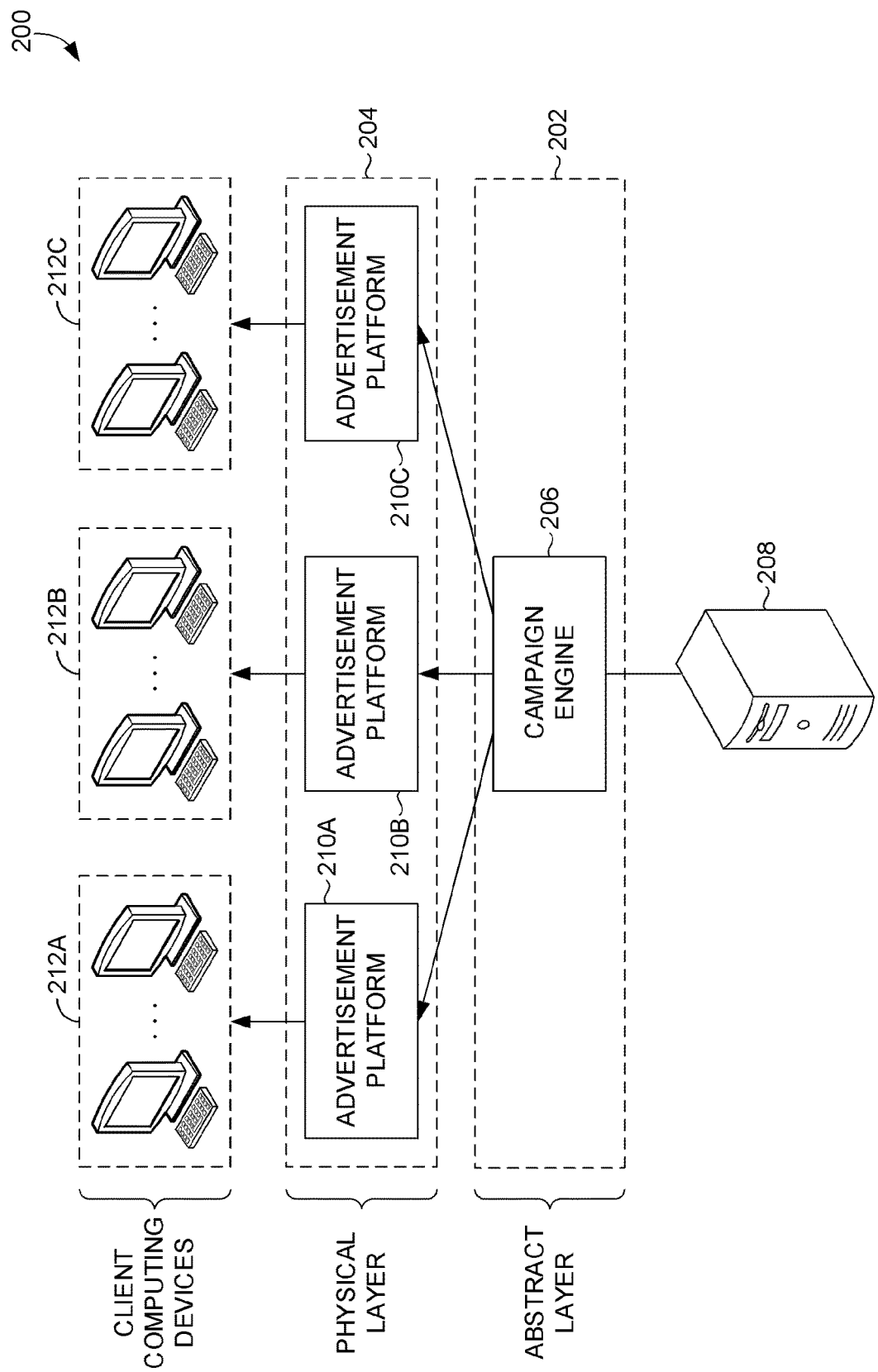
FIG. 2 is an example system configuration illustrating integration of different advertisement platforms using a campaign engine, in accordance with an embodiment described herein.

Turning briefly to FIG. 2, an example system configuration 200 illustrating integration of different advertisement platforms using campaign engine 206 is provided. Like other illustrated aspects of the technology, it will be understood that this just one example, and other arrangements may be suitable for employing the technology.

As illustrated in FIG. 2, campaign engine 206 is provided within abstract layer 202. Abstract layer 202 illustrates a theoretical layer of software code in which implementations of campaign engine 206 can be employed. Campaign engine 108 of FIG. 1 is one example suitable for use as campaign engine 206.

Campaign engine 206 can be hosted on server 208. Server 208 may comprise a computing device, such as computing device 700 of FIG. 7. Server 208 may comprise at least one processor or computer-executable instructions, that when executed by the at least one processor, implement operations of campaign engine 206.

Campaign engine 206 communicates with advertisement platforms 210A-210C. Advertisement platforms 210A-210C may be any system provided by an advertising partner, from which advertisements can be delivered. Some advertisement platforms, including those that are represented by advertisement platforms 210A-210C include internet search engines or other internet websites, social media services, mobile applications, and so forth. Advertisement platforms 210A-210C may comprise computing systems with which campaign engine 206 communicates. Such computing systems of advertisement platforms 210A-210C facilitate employment of physical advertisement campaigns that are hosted in physical layer 204. The physical advertisement campaigns are provided via software programs of advertisement platforms 210A-210C, which are used to provide advertisements to client computing devices 212A-212C.

Figure 7:
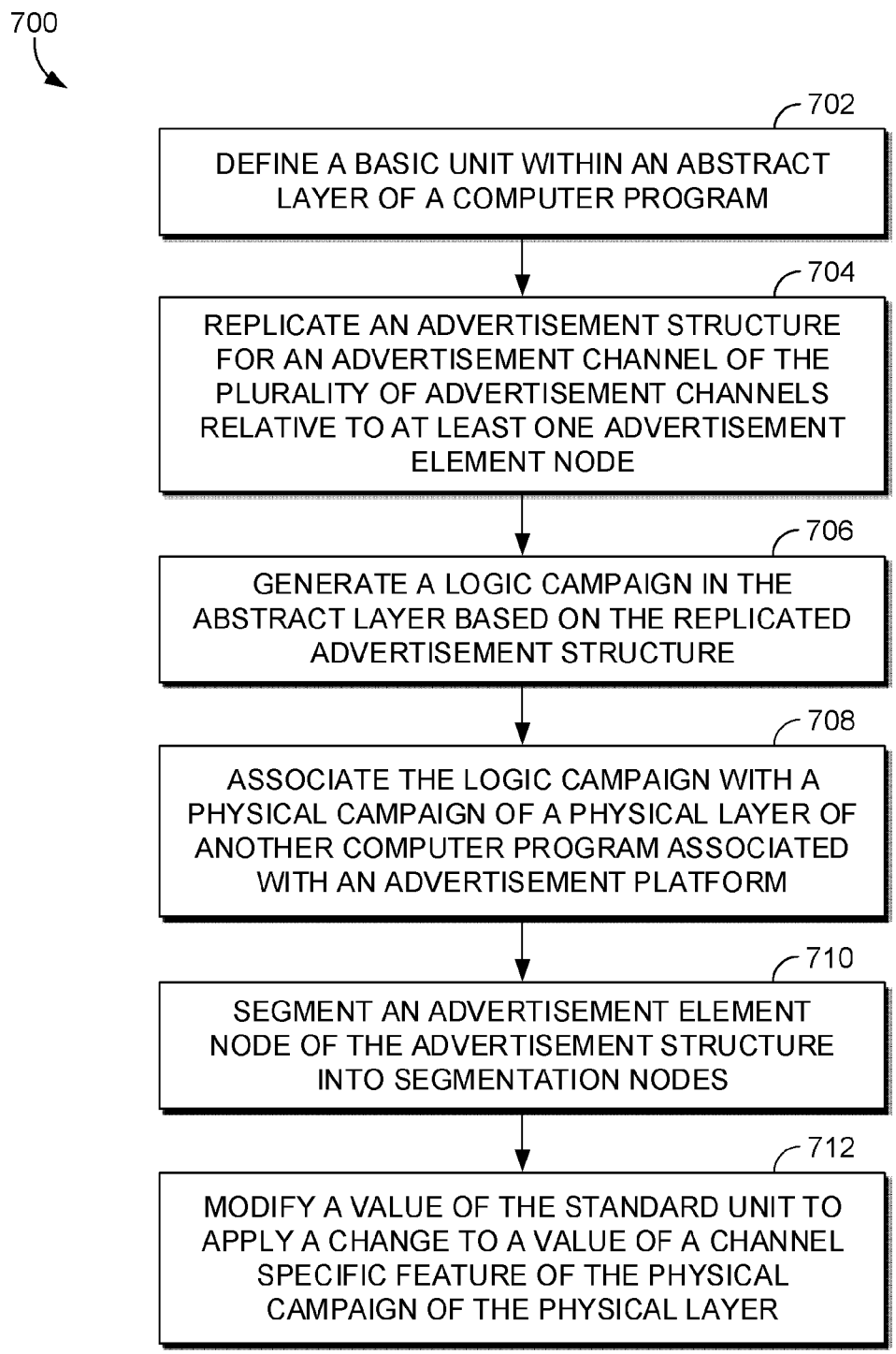
FIG. 7 is a block diagram of an example method for integrating advertisement software platforms, in accordance with an aspect described herein.

Client computing devices 212A-212C may be any computing devices, such as computing device 700 of FIG. 7. Each of client computing devices 212A-212C is illustrated having an ellipsis to illustrate that advertisement platforms 210A-210C may be communicating with any number of client computing devices within client computing devices 212A-212C. It is also noted that while illustrated as desktop devices, client computing devices 212A-212C may take any form of computing device, including mobile devices, smartphones, tablets, smartwatches, internet-of-things devices, electronic billboards, and so on.

Figure 3:
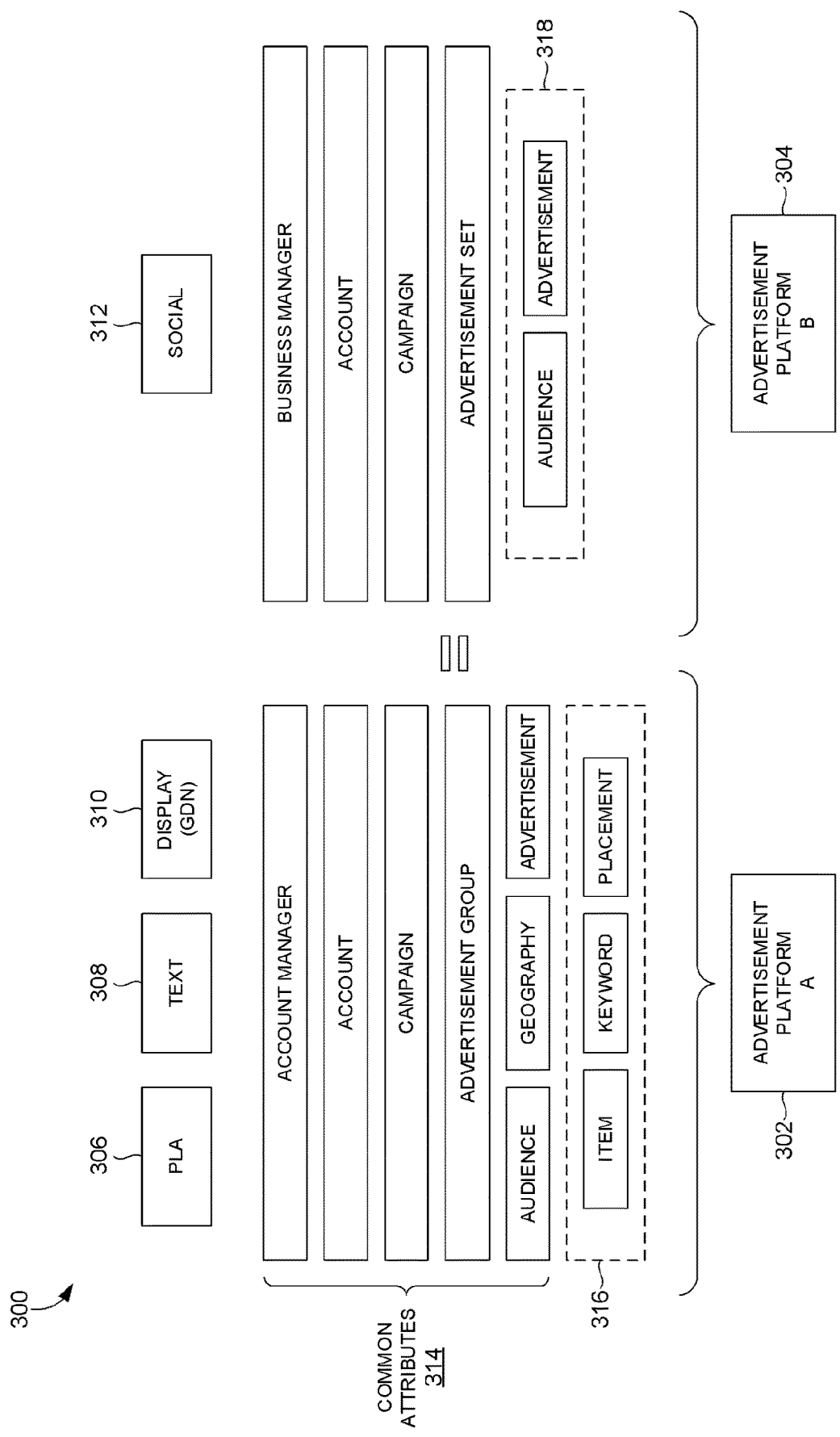
FIG. 3 illustrates example physical layer structures of different advertisement platforms, in accordance with an embodiment described herein.

FIG. 3 illustrates example physical layer structures of different advertisement platforms, including advertisement platforms 210A-210C described in FIG. 2. While FIG. 3 illustrates two example advertisement platforms, advertisement platform A 302 and advertisement platform B 304, these are just examples to assist in describing the technology, and it will be understood that other advertisement platforms will comprise different structures with which the technology be employed.

Advertisement platform A 302 is shown providing advertisements using at least three different advertisement channels, including first advertisement channel 306, second advertisement channel 308, and third advertisement channel 310. Each of the advertisement channels associated with advertisement platform A 302 has a different advertisement channel type (i.e., advertisement type). In this case, first advertisement channel 306 provides PLA advertisements, which in many cases include an image of a product or service comprising a hyperlink to a landing page associated with the product or service of the image. Second advertisement channel 308 provides text advertisements, which may provide text in an area of a graphical user interface that describes the product or links to a landing page. Third advertisement channel 310 provides advertisements via GDN, or Google Display Network, which can provide website targeting. Advertisement platform B 304 is shown providing fourth advertisement channel 312 associated with a social advertisement type, which might provide ads on social networks.

It will be understood that, in practice, and as illustrated, the system architecture of each of the advertisement platforms may be different, and each is utilizing different advertisement types. While there are some illustrated common attributes 314, there are also attributes that are channel specific features, such as first channels specific features 316 and second channel specific features 318. The channel specific features may be features that are used to design or implement a physical campaign associated with the various advertisement types employed by the advertisement platforms. Thus, when designing advertisement campaigns, the resulting physical campaigns are often different from one advertisement platform to the next because of the system architecture of the advertisement platform and the various advertisement channels employed by the advertisement platforms.

Turning back to FIG. 1, campaign engine 108 is one example that can be used in this technological space to provide some of the previous benefits discussed, such as providing a system that integrates these various advertisement platforms and advertising channels.

Campaign engine 108 is illustrated as employing advertisement structure generator 110. Advertisement structure generator 110 generally generates an advertising structure for an advertisement channel, such as PLA, text, GDN, social, and the like.

When generating an advertisement structure, advertisement structure generator 110 can define a basic unit. The basic unit comprises a logical variable from which advertising features can be extracted, including channel specific advertising features. As discussed with reference to FIG. 3, various advertisement platforms may utilize different advertising features including item, keyword, placement, audience, and advertisement, among others. Some of these include channel specific advertising features that are specific to a particular advertisement channel. For instance, a photo of an item may be specific to a PLA advertisement compared to a text advertisement, and thus, bidding on a text advertisement is different since the delivery of the text versus delivery of the photo may occur in different scenarios.

Figure 4:
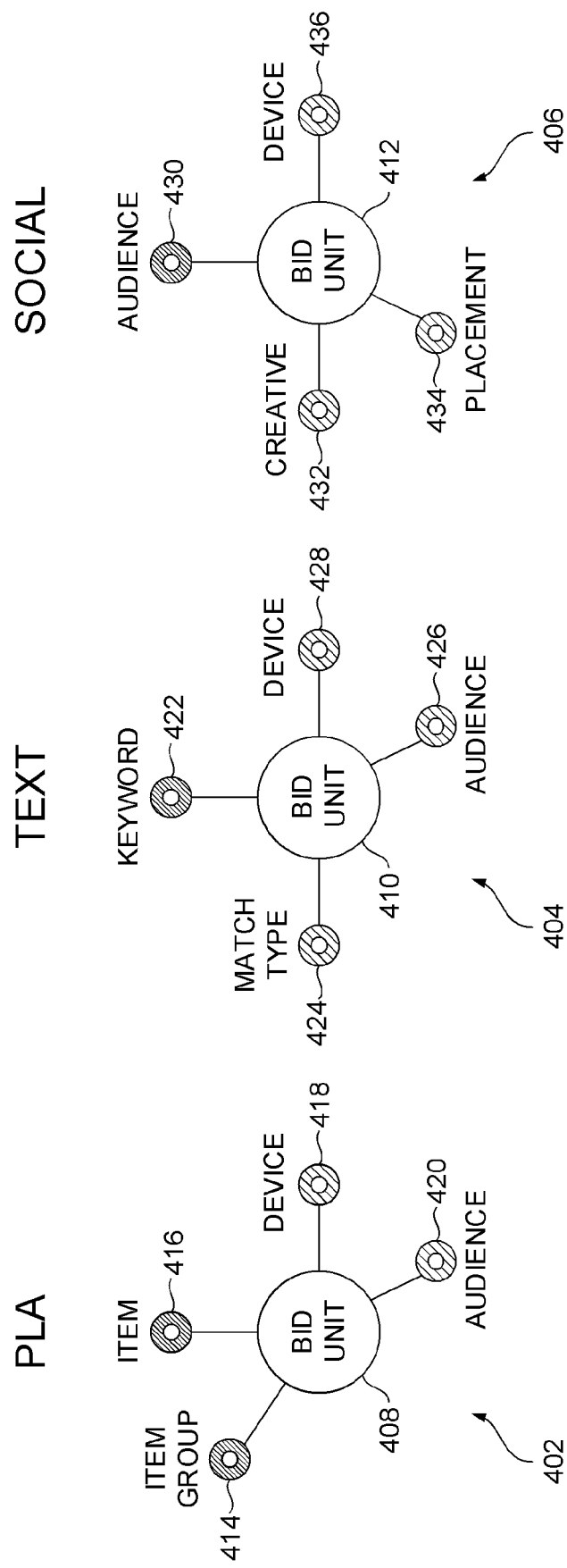
FIG. 4 illustrates an example basic unit being correlated to advertisement element nodes for different advertisement channel types; in accordance with an embodiment described herein.

The basic unit can be defined and correlated to the structural representations of the various advertising features. These structural representations comprise advertisement element nodes, and the advertisement element nodes correlate to the basic unit for each of the advertisement types. FIG. 4 illustrates some examples of correlating advertisement element nodes to a basis unit. For this illustration, a bid unit has been selected as the basis unit, meaning the bid that is placed on the advertising. Like the bid unit, the basic unit can be defined as common between advertisement types. As noted, the basic unit is abstracted in the abstract layer.

FIG. 4 illustrates this. For instance, first bid unit 408, second bid unit 410, and third bid unit 412 can each be the same bid unit, meaning that a modification to the bid unit is an equal modification to each of first bid unit 408, second bid unit 410, and third bid unit 412 in the abstract layer.

First bid unit 408 is illustrated in the context of a PLA advertisement type. Thus, advertisement element nodes, including item group 414, item 416, device 418, and audience 420 have each been correlated to the bid unit. Here, audience 420 may include who a PLA advertisement is delivered to, for example, geography, individuals interested in certain hobbies, individuals having particular professions, individuals having a certain income level, and so on. Each group in which audience can be divided can be called an advertisement element node option. In another example, the advertisement element node options for device can be mobile devices, desktop devices, smartwatches, IOT devices, tablets, and so on. It will be recognized by those of ordinary skill in the art that each of the advertisement element nodes may comprise any number of advertisement element nodes options.

The basic unit correlation may comprise multipliers that define an advertisement element node option relative to the basic unit. Using the bid unit example with regard to PLA, e.g., PLA-based advertisement example 402, when bidding on a PLA advertisement, a PLA advertisement to the mobile devices of an audience within a particular geographical area of a specific item, may have a cost associated with each that is derived from the various advertisement element nodes options. As such, each of the correlations for the advertisement element node options to the bid unit can be abstracted using the multiplier.

In some cases, advertisement element nodes may represent different advertisement feature types. Here, a first type is illustrated using a light dash line and includes audience 420 and device 418, while a second type is illustrated using a dark dash line and includes item group 414 and item 416. As examples, the first type comprises destination features, e.g., to where the advertisement is delivered or the location or look of the advertisement being provided, while the second type comprises content features, e.g., the content of the delivered advertisement.

FIG. 4 provides two additional examples of advertisement element nodes representing advertisement element node options of various advertisement features for text-based advertisements and social-based advertisements. It will be understood that there may be additional or less advertisement element nodes for each advertisement type, and there may be additional advertisement types; however, it would be impracticable to describe each and every type or configuration, and as such, only a few examples have been provided.

As such, FIG. 4 also includes a text-based advertisement example 404 that comprises advertisement element nodes for match type 424, keyword, 422, audience 426, and device 428, each of which is correlated to bid unit 410. Similarly, FIG. 4 provides a social-based advertisement example 406 that comprises advertisement element nodes that include audience 430, creative 432, placement 434, and device 436. As shown, advertisement element nodes can represent features that are common to one or more advertisement types, or advertisement specific features that are specific to a particular advertisement type.

Turning back to FIG. 1, advertisement structure generator 110 can generate advertisement structures for each of the advertisement channel types using the advertisement element notes. In some cases, this will also include generating the advertisement structures with advertisement element nodes that have been correlated to a basic unit, such as the bid unit. To generate the advertisement structures, advertisement structure generator 110 can make logical associations between advertisement element nodes. In one instance, the logical association comprises a hierarchy of the nodes cascading from a single node and includes an advertisement element node for each advertisement element node option for each of the advertisement element nodes for the advertisement type.

Figure 5A:
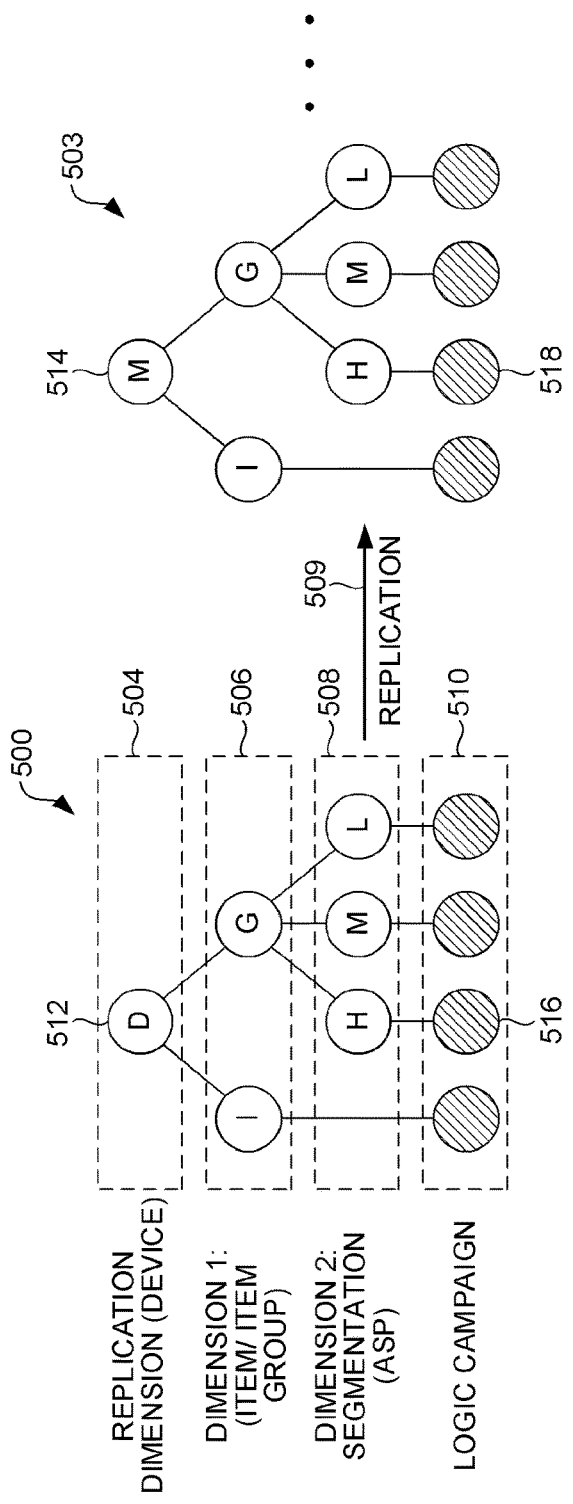
FIGS. 5A-B illustrate replication of different advertisement structures relative to an advertisement element node, in accordance with an embodiment described herein.

FIG. 5A has been provided to illustrate some simplistic examples of advertisement structures generated by advertisement structure generator 110. FIG. 5A provides an example advertisement structure 500 that, in part, illustrates an advertisement structure generated using the advertisement element node options for PLA, shown in FIG. 4.

In FIG. 5A, advertisement structure 500 comprises advertisement element node option 512 that is included in replication dimension 504. As will be described in more detail, this is the dimension where the replication will occur relative to advertisement element node 512. In some cases, the advertisement structure generator 110 generates advertisement structure 500 to include one or more advertisement element nodes in replication layer 504. In the particular example shown, advertisement structure generator 110 generates advertisement structure 500 that comprises a single advertisement element node option, here advertisement element node option 512, in the replication layer. In this example, replication dimension 504 has been selected as device, meaning that advertisement element node 512 is associated with advertisement element node options for device, as previously described with regard to FIG. 4.

From replication dimension 504, one or more of the remaining advertisement element nodes associated with the advertisement channel can be associated with advertisement element nodes of the replication dimension, where the remaining nodes are included in a different dimension. Here, advertisement element nodes for item and item group have been each associated with advertisement element node 512, and each is included within first dimension 506.

In some implementations of the technology, advertisement structure generator 110 further segments one or more of the advertisement element nodes. The segmentation may be performed on the advertisement element nodes that are in the different dimensions relative to the replication dimension. As illustrated, some of the advertisement element nodes associated with item and item group in first dimension are being segmented. In particular, the advertisement element nodes associated with item group are being segmented into three categories, high, medium, and low. The segmentation occurring in the illustration of FIG. 5A is being performed based on ASP segmentation, which logically segments item group further into high, medium, and low user levels. It will be recognized that segmentation can occur among many different dimensions and many different advertisement element nodes or advertisement element node options may be segmented along different lines. Segmentation is generally performed where an advertisement element node or the associated advertisement element node options can be logically categorized into subgroups. Some additional examples include subcategories related to geography, demographics, psychographics, behavioral, among many others. Only some are examples are being provided in a limited illustration, as providing or listing each and every segmentation possibility is impracticable, but each is considered to be within the scope of the technology and suitable for implementation of the technology.

When segmenting, advertisement structure generator 110 may generate segmentation nodes, as illustrated in segmentation dimension 508. Here, segmentation nodes include a segmentation node for each of the segments of the segmentation, including a first segmentation node labeled "H" for high, a second segmentation node labeled "M" for medium, and a third segmentation node labeled "L" for low.

As noted, FIG. 5A has been provided only as an example, and some advertisement element nodes and segmentation nodes have not been included, as it would not be practicable to illustrate the structure in its entirety. One part of the advertisement structure related to the PLA channels is provided to illustrate how the components of campaign engine 108 can be created and employed for effect the desired result. Depending on the advertisement channel and various advertisement options available, the advertisement structure may be as simple as those illustrated or more complex.

Figure 5B:
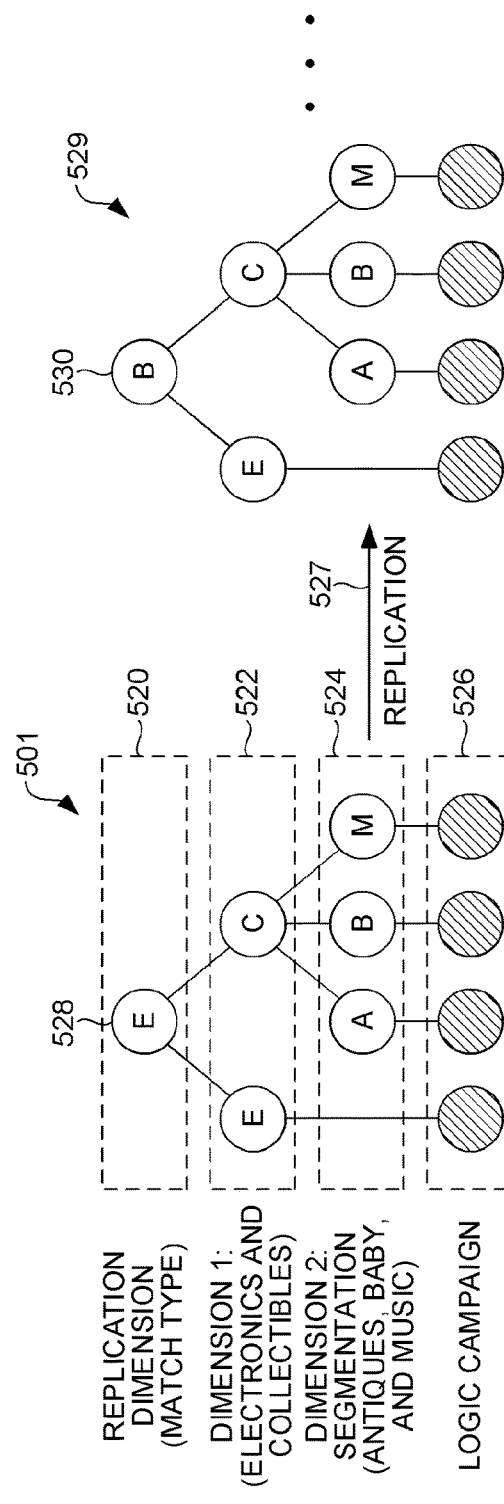

However, to illustrate yet another example to aid in describing the technology, FIG. 5B provides part of another example advertisement structure 501. Advertisement structure 501 is provided to illustrate part of the advertisement structure that can be generated for a text-based advertisement channel. Here, advertisement element node 528 is illustrated in replication dimension 520. In general, any of the advertisement element nodes associated with the text-based advertisement channel could be selected for performing the replication.

Advertisement structure 501 also comprises some additional advertisement element nodes, including those for electronics and collectibles, which includes first dimension 522 that is different from replication dimension 520. Each of the advertisement element nodes in first dimension 522 have been associated with advertisement element node option 528 of replication dimension 520.

In some cases, such as the one illustrated, remaining advertisement element nodes that are not included in a replication dimension are separately associated with the one or more advertisement element nodes of the replication dimension. That is, each remaining advertisement element node option is associated with the one or more advertisement element nodes options in the replication layer. However, in this example, the remaining one or more advertisement element nodes are not associated with any of the other remaining one or more advertisement element nodes of the different dimension. To illustrate using an example, the advertisement element nodes of first dimension 522 of FIG. 5B are associated with advertisement element node 528 of replication dimension 520; however, the advertisement element node associated with electronics is not associated with the advertisement element node for collectibles in first dimension 522.

Continuing with the example provided in FIG. 5B, advertisement structure generator 110 has segmented one or more of the advertisement element nodes of first dimension 522. In this case, the advertisement element node option for collectibles has been segmented further into antiques, baby, and music. These are just some example categories to aid in describing the technology. Each segmentation node has generated a segmentation option (i.e., the segments) of segmentation dimension 524. Here, a first segmentation node is associated with a first segment labeled "A" for antiques, a second segmentation node is associated with a second segment labeled "B" for baby, and a third segmentation node associated with a third segment has been labeled "M" for music. Each represents a logical category of collectibles.

Having described some examples of how advertisement structure generator 110 generates advertisement structures, such as those provided in FIGS. 5A and 5B, campaign engine 108 may employ advertisement structure replicator 112. Advertisement structure replicator 112 generally replicates the advertisement structure generated by advertisement structure generator 110.

Advertisement structure replicator 112 may replicate an advertisement structure generated for an advertisement channel relative to at least one advertisement element node. In doing so, advertisement structure replicator 112 generates a replicated advertisement structure. In general, the initial advertisement structure and the replicated advertisement structure may have the same structure with respect to the advertisement element nodes. One or more of the advertisement element node options associated with one or more of the advertisement element nodes of the replication dimension may be changed by advertisement structure replicator 112 during the replication.

With reference again to FIGS. 5A and 5B, the figures illustrate an example replication that can be performed by advertisement structure replicator 112. In FIG. 5A, replication arrow 509 illustrates the replication of advertisement structure 500 to generate replicated advertisement structure 503. An ellipsis is provided to illustrate that the replication may continue beyond replicated advertisement structure 503.

In FIG. 5A, replication has occurred relative to advertisement element node 512. In this case, structurally, advertisement element node 514 is a duplicate of advertisement element node 512. Put another way, advertisement element node 514 and advertisement element node 512 each represent advertisement element node options for device. During the replication, advertisement structure generator 112 changes the advertisement element node option for device. As illustrated, advertisement element node 512 of advertisement structure 500 changes from "D" to represent a desktop device, to an "M" to represent a mobile device when replicated to advertisement element node 514 of replicated advertisement structure 500.

As noted, the remaining element nodes may each be generated within a structure to represent each advertising element node option for an advertising aspect or feature, such as audience, creative, item group, and the like. Thus, in one implementation, advertisement structure replicator 112 does duplicate the remaining advertisement element nodes in the different dimension from the replication dimension and does not change the associated advertisement element node option.

Again, to illustrate this example, FIG. 5A includes replicated advertisement structure 503 Replicated advertisement structure 503 comprises advertisement element nodes associated with item and item group that are duplicates from those in advertisement structure 500 and are each also associated with the same respective advertisement element node options.

In some cases, advertisement structure generator 110 will generate segmentation nodes prior to advertisement structure replicator 112 replicating the advertisement structures. In this case, the segmentation nodes are also included in the replicated advertisement structure. Similarly, the segmentation nodes of the replicated advertisement structure may be duplicated and the associated segment is not changed.

In an example illustration, replicated advertisement structure 503 comprises segmentation nodes associated with high, medium, and low that are duplicates from those in advertisement structure 500 and are each also associated with the same respective segments.

To further aid in describing the technology, FIG. 5B provides another replication example where advertisement structure 501 is replicated relative to one or more nodes of a replication dimension for match type, as illustrated by replication arrow 527, to generate advertisement structure 529, which may be performed by advertisement structure replicator 112. Here, advertisement element node 528 is duplicated to advertisement element node 530 and the advertisement element node is changed from "E" for exact match, for instance, an exact match between a search query and an advertisement campaign word, and "B" for broad match, for instance, matching a search query and an advertising campaign word after search query expansion.

FIG. 5B also comprises replicated advertisement element nodes, such as those representing electronics and collectibles, which have retained their same associated advertisement element node option. Similarly, in this case, FIG. 5B also comprises replicated segment nodes, such as those representing antiques, baby, and music, which have retained their same associated advertisement element node option within replicated advertisement structure 529.

Advertisement structure replicator 112 may continue replicating an advertisement structure though each advertisement element node option of the advertisement element nodes in the replication dimension. That is, an advertisement element node in the replication dimension may represent an attribute having multiple advertisement element node options. In a simple example, the advertising attribute for device may comprise desktop device, mobile device, and tablet. In this scenario, advertisement structure replicator 112 may replicate an advertisement structure to generate at least three advertisement element structures, such that each of the duplicated advertising element nodes in the replication dimension are respectively associated with one of the advertisement element node options for the advertisement feature.

Campaign engine 108, as illustrated in FIG. 1, also employs logic campaign generator 114. Logic campaign generator 114 generally generates logic campaigns for the advertisement structures, including the replicated advertisement structure.

In general, logic campaign generator 114 generates logic campaigns in the abstract layer based on advertisement structures, including replicated advertisement structures. Logic campaign generator 114 may generate logic campaigns before or after replication by advertisement structure replicator 112.

In one example, logic campaign generator 114 generates logical campaigns based on a leaf node of an advertisement structure. The leaf node may correspond to a segmentation node or an advertising element node. In an aspect, logic campaign generator 114 generates a logic campaign for each leaf node of all advertisement structures, including the replicated advertisement structures.

Logic campaign generator 114 may generate a logic campaign to include each option associated with corresponding nodes. Corresponding nodes may include each node having an association within an advertising structure beginning with a node that is associated with the logic campaign, which sometimes comprises the leaf node. As an example, turning briefly back to FIG. 5A logic campaign 516 has corresponding nodes that comprise the segmentation node associated with the high segment, the advertising element node associated with the item group advertising element node option, and the advertising element node associated with the desktop device advertising element node option. Thus, logic campaign 516 may be generated to include a PLA advertisement delivered on a desktop device associated with a high category of item group. Similarly, within replicated advertisement structure 503, advertisement campaign 518 is generated to include delivery of a PLA advertisement on a mobile device associated with a high category of item group. This pattern may continue for all of the logic campaigns.

Figure 6:
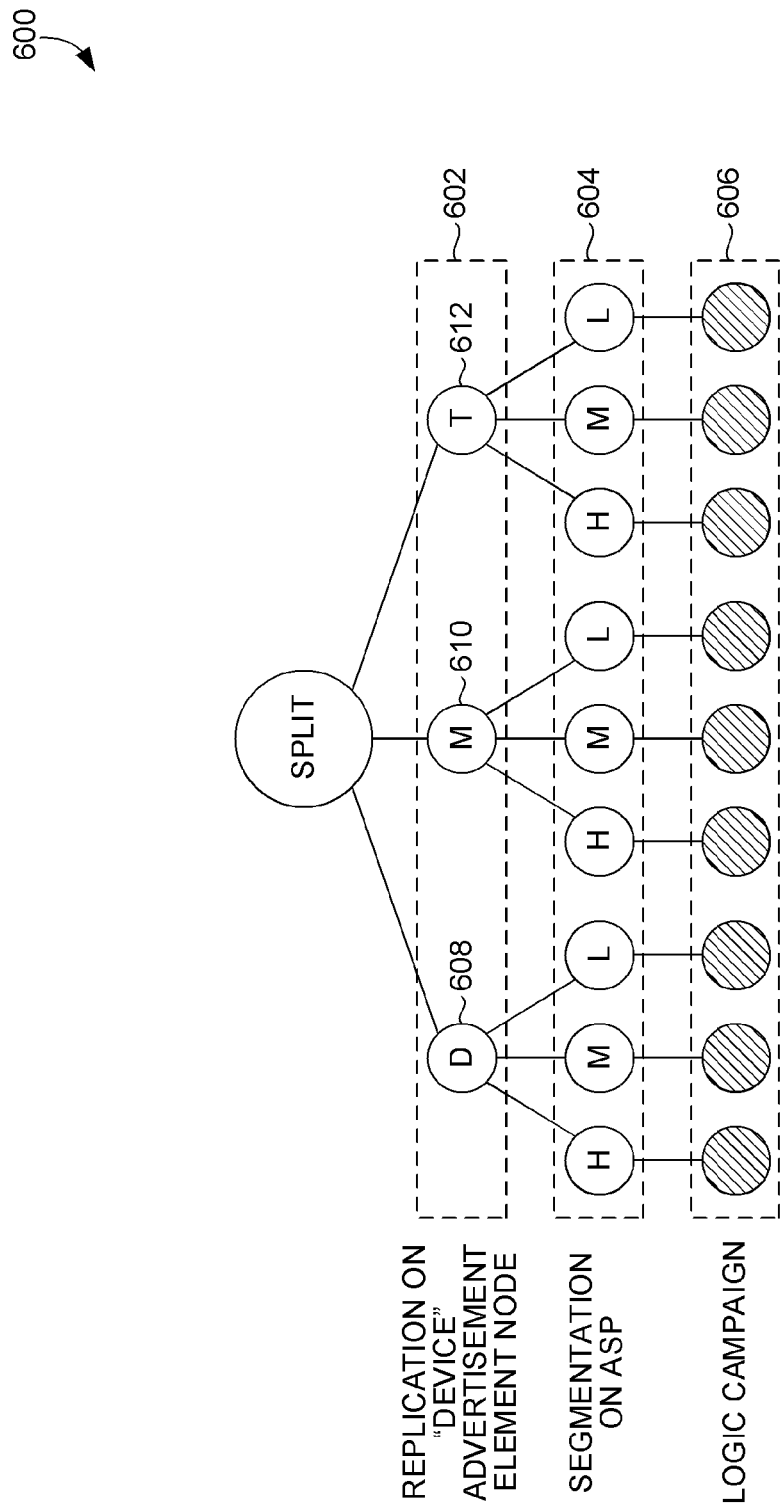
FIG. 6 is an illustration of example replicated advertising structures having logic campaigns generated based on the replicated structures, in accordance with an embodiment described herein.

With reference now to FIG. 6, FIG. 6 provides illustration 600 that includes an example results output of advertisement structure generator 110, advertisement structure replicator 112, and logic campaign generator 114. Illustration 600 provides a simple example output for an advertisement channel having one advertisement element node that represents advertisement features for device, wherein the example includes only three advertisement element node options for device, including desktop device "D," mobile device "M," and tablet "T." For the sake of clarity, only one advertising element node has been provided in the replication layer, and no additional advertisement element nodes for a different dimension have been included, as increasing the dimensionality would make the illustration complex and less clear when describing. Instead, only one segmentation has been included, which segments the advertising element node of replication dimension 602 into segments of high "H," medium "M," and low "L," in keeping with previous examples.

In illustration 600, advertisement structure generator 110 has generated an advertisement structure having an advertisement element node associated with device in replication layer 602 and segmented the advertisement element node into three segments within segmentation layer 604. Advertisement structure replicator 112 has replicated the advertisement structure to provide at least three advertisement structures that are duplicates and have different advertisement element node options associated with the advertisement element node of the replication layer. Thus, in this example scenario, advertisement structure replicator 112 has replicated the advertisement structure through all of the advertisement element options, as illustrated using the split node. Logic campaign generator 114 has generated a logic campaign for each of the leaf nodes, which in illustration 600 comprises each of the segmentation nodes. Thus, each of the logic campaigns comprises a segment from a corresponding segmentation node and an advertisement element node option from a corresponding advertisement element node.

Continuing with campaign engine 108 of FIG. 1, campaign engine 108 utilizes logic campaign associator 116 to associate a logic campaign to the physical layer of an advertising platform. Logic campaign associator 116 generally associates a logic campaign with a physical campaign, wherein changes to the logic campaign impart changes to the physical campaign of the physical layer.

Logic campaign associator 116 may associate logic campaigns with the physical layer or physical campaigns in a number of ways. In one example, logic campaign associator selects a generated logic campaign that is compatible for the system of the advertisement platform. That is, the logic campaign may be selected based on its inclusion of features for an advertisement channel that the advertisement platforms utilize and includes advertisement element node options or segments that are utilized by the system of the advertising platform. The selected logic campaign can be communicated to the system of the advertising platform for implementation.

In another example of associating a logic campaign, logic campaign associator 116 provides an association between aspects of the logic campaign with aspects of an already provided physical campaign in the physical layer. That is the physical campaign may include campaign options that correspond to the advertising element node options or the segments of the logic campaign. In such cases, logic campaign associator 116 may make the association so that when changes are made to the logic campaign, corresponding changes are made to the physical campaign that is implemented by the system of the advertising platform.

In yet another example of associating a logic campaign, the logic campaign associator 116 provides the logic campaign to an application programming interface (API) of the advertising platform system for implementation as a physical campaign by the advertising platform.

Having associated the logic campaigns with the physical campaigns of the physical layer, the abstract layer can be used to implement changes across various advertising platforms and channels. As noted earlier, a basic unit is correlated to the advertising element nodes, which are included in the advertisement structures and replicated advertisement structures. The logic campaigns are associated with the physical campaigns. As such, a modification of the basic unit modified the instruction to the physical layer to implement the physical campaign in accordance with the instructions. For instance, when a value of the basic unit is modified, a value of one of the features, including channel specific features, of the physical campaign is changed based on the modification, thereby affecting the implementation of the physical campaign.

With reference to FIG. 7, a block diagram is provided to illustrate method 700 for integrating advertisement software platforms. Method 700 may be performed using campaign engine 108 of FIG. 1. In embodiments, one or more computer storage media having computer-executable instructions embodied thereon that, when executed, by one or more processors, cause the one or more processors to perform operations of the method.

At block 702, a basic unit within an abstract layer of a computer program is defined. At block 704, an advertisement structure for an advertisement channel of the plurality of advertisement channels is replicated relative to at least one advertisement element node to generate a replicated advertisement structure. For instance, the advertisement structure can be duplicated and the advertising element node option of the at least one advertisement element node can be changed. The replication can be performed through each of the advertisement element node options for the at least one advertisement element node. In some cases, there are a plurality of advertisement structures associated with different advertisement channels. The replication can be performed for each of the advertisement channels.

At block 706, a logic campaign is generated in the abstract layer based on the replicated advertisement structure. The logic campaign may be generated by defining a logic campaign for each leaf node of the replicated advertisement structure, where a logic campaign comprises the advertisement element nodes options or the segments of corresponding advertisement element nodes and segmentation nodes relative to the leaf node associated with the logic campaign.

At block 708, the logic campaign is associated with a physical campaign of a physical layer of another computer program associated with an advertisement platform. At block 710, an advertisement element node of the advertisement structure is segmented into segmentation nodes. At block 712, a value of the standard unit is modified to apply a change to a value of a channel specific feature of the physical campaign of the physical layer.

It will be recognized that method 700 is just one example. Some additional operations may be provided, while some described operations may be omitted, and the operations can be performed in an order practicable. In an example, a method includes defining a basic unit, replicating an advertisement structure, generating a logic campaign, and associating the logic campaign with a physical campaign of a physical layer. In another example, a method includes replicating an advertisement structure, generating a logic campaign, and associating the logic campaign with a physical campaign of the physical layer. In another example, a method includes modifying a value of a standard unit in an abstract layer.

Figure 8:
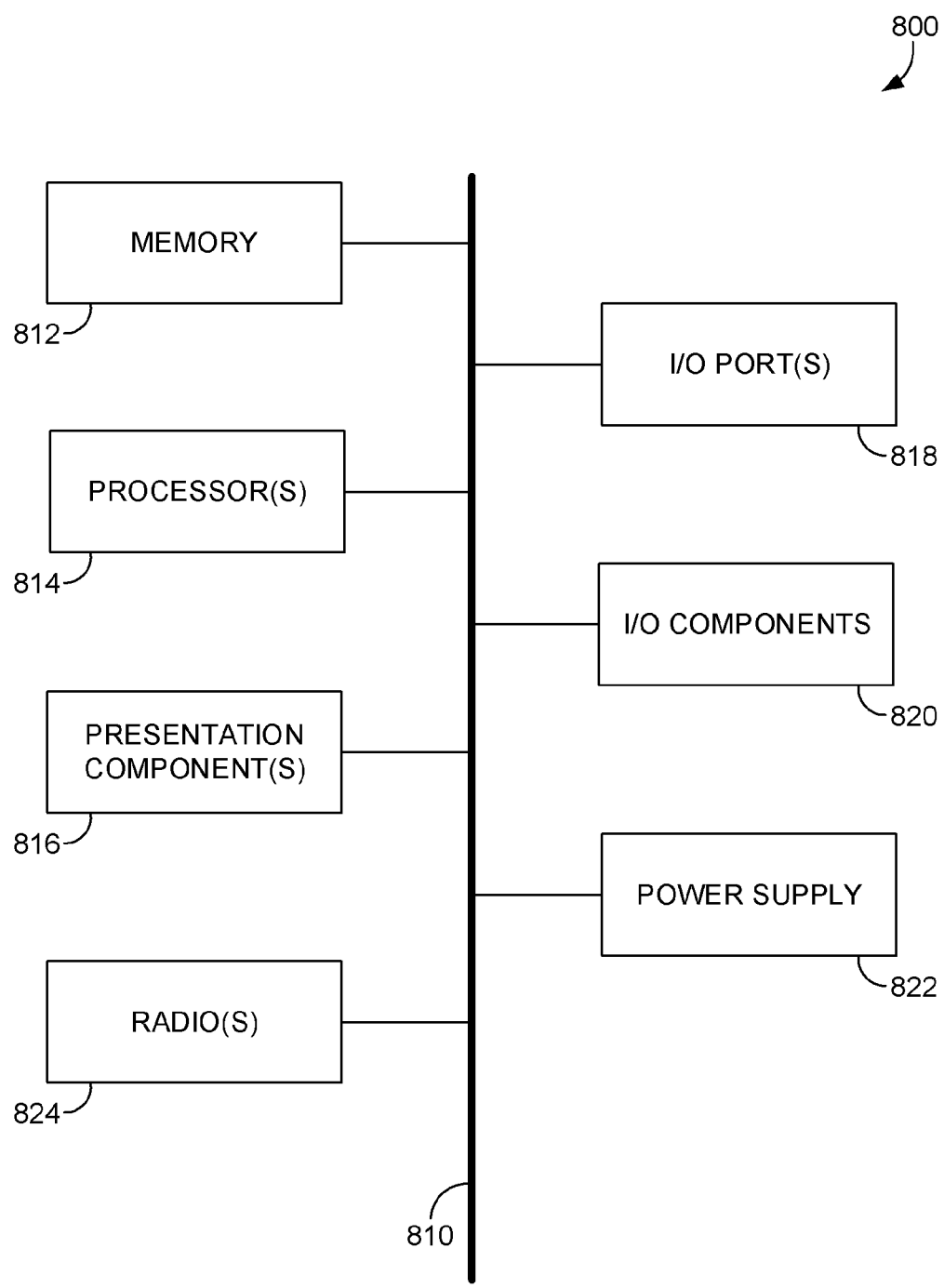
FIG. 8 is an example computing device suitable for implementing the described technology, in accordance with an embodiment described herein.

Having described an overview of embodiments of the present technology, an example operating environment in which embodiments of the present technology may be implemented is described below in order to provide a general context for various aspects of the present technology. Referring initially to FIG. 8, in particular, an example operating environment for implementing embodiments of the present technology is shown and designated generally as computing device 800. Computing device 800 is but one example of a suitable computing environment and is not intended to suggest any limitation as to the scope of use or functionality of the technology. Neither should computing device 800 be interpreted as having any dependency or requirement relating to any one or combination of components illustrated.

The technology of the present disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The technology may be practiced in a variety of system configurations, including hand-held devices, consumer electronics, general-purpose computers, more specialty computing devices, etc. The technology may also be practiced in distributed computing environments where tasks are performed by remote-processing devices that are linked through a communications network.

With reference to FIG. 8, computing device 800 includes bus 810 that directly or indirectly couples the following devices: memory 812, one or more processors 814, one or more presentation components 816, input/output ports 818, input/output components 820, and illustrative power supply 822. Bus 810 represents what may be one or more busses (such as an address bus, data bus, or combination thereof).

Although the various blocks of FIG. 8 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 8 merely illustrates an example computing device that can be used in connection with one or more embodiments of the present technology. Distinction is not made between such categories as "workstation," "server," "laptop," "hand-held device," etc., as all are contemplated within the scope of FIG. 8 and reference to "computing device." Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer storage media in the form of volatile or nonvolatile memory. The memory may be removable, non-removable, or a combination thereof. Example hardware devices include solid-state memory, hard drives, optical-disc drives, etc. Computing device 800 includes one or more processors that read data from various entities such as memory 812 or I/O components 820. Presentation component(s) 816 present data indications to a user or other device. Examples of presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc.

Embodiments described above may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of the present technology is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" or "block" might be used herein to connote different elements of methods employed, the terms should not be interpreted as implying any particular order among or between various steps herein disclosed unless and except when the order of individual steps is explicitly stated.

For purposes of this disclosure, the word "including" has the same broad meaning as the word "comprising," and the word "accessing" comprises "receiving," "referencing," or "retrieving." Further, the word "communicating" has the same broad meaning as the word "receiving," or "transmitting" facilitated by software or hardware-based buses, receivers, or transmitters using communication media described herein. Also, the word "initiating" has the same broad meaning as the word "executing" or "instructing" where the corresponding action can be performed to completion or interrupted based on an occurrence of another action. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present technology are described with reference to a distributed computing environment; however the distributed computing environment depicted herein is merely an example. Components can be configured for performing novel aspects of embodiments, where the term "configured for" can refer to "programmed to" perform particular tasks or implement particular abstract data types using code.

From the foregoing, it will be seen that this technology is one well adapted to attain all the ends and objects described above, including other advantages that are obvious or inherent to the structure. It will be understood that certain features and subcombinations are of utility and may be employed without reference to other features and subcombinations. This is contemplated by and is within the scope of the claims. Since many possible embodiments of the described technology may be made without departing from the scope, it is to be understood that all matter described herein or illustrated the accompanying drawings is to be interpreted as illustrative and not in a limiting sense.

What is claimed is:

1. A system for integrating advertisement software platforms, the system comprising:
   at least one processor; and
   one or more computer storage media storing computer executable instructions that when executed by the at least one processor, cause the at least one processor to perform operations comprising:
      defining a basic unit, within an abstract layer of a computer program, common across a plurality of different types of advertisement channels by correlating advertisement element nodes of the plurality of different types of advertisement channels;

generating hierarchal structures, for the plurality of different types of advertisement channels, using the advertisement element nodes correlated to the basic unit;

replicating, in the abstract layer of the computer program, one or more advertisement element nodes of a hierarchal structure of the hierarchal structures to generate a replication layer of the hierarchal structure;

generating, based on replicating the one or more advertisement element nodes of the hierarchal structure, a logic campaign in the abstract layer of the computer program, the logic campaign including the hierarchal structure having the replication layer, in the abstract layer;

associating the logic campaign with a physical campaign of a physical layer of another computer program associated with an advertisement platform; and modifying the physical campaign of the physical layer by using the associated logic campaign and based on a modification to the basic unit within the abstract layer.

2. The system of claim 1, further comprising segmenting an advertisement element node of the hierarchal structure into segmentation nodes, the segmentation nodes representing a logical categorization of an advertising element node option associated with the advertisement element node being segmented.

3. The system of claim 2, wherein the logic campaign is generated to comprise an advertisement element node option associated with a corresponding element node and a segment associated with a corresponding segmentation node of the hierarchal structure having the replication layer.

4. The system of claim 1, further comprising: duplicating remaining advertisement element nodes in different layers from the replication layer of the hierarchal structure; and changing an advertisement element node option associated with the replication layer.

5. The system of claim 1, further comprising replicating all advertisement element nodes of the hierarchal structure through all advertisement element node options.

6. The system of claim 1, further comprising: performing the replication for each hierarchal structure associated with the plurality of different types of advertisement channels; and modifying a value of the basic unit to apply a change to a value of a channel specific feature of the physical campaign of the physical layer.

7. The system of claim 6, continuously modifying the value of the basic unit until a quota limit of the physical campaign has been reached.

8. One or more non-transitory computer storage media storing computer-readable instructions that, when executed by a processor, cause the processor to perform operations for integrating advertisement software platforms, the operations comprising:

Replicating, within an abstract layer of a computer program, one or more advertisement element nodes of a hierarchal structure of an advertisement channel to generate a replication layer, the hierarchal structure comprising advertisement element nodes correlated to a basic unit that is defined within the abstract layer as common across a plurality of different types of advertisement channels that includes the advertisement channel;

Generating, within the abstract layer, a replicated hierarchal structure of the hierarchal structure based on generating the replication layer;

Generating a logic campaign in the abstract layer based on the replicated hierarchal structure;

Associating the logic campaign with a physical campaign of a physical layer of another computer program associated with an advertisement platform; and Modifying the physical campaign of the physical layer by using the logic campaign and based on a modification of the basic unit within the abstract layer.

9. The non-transitory computer storage media of claim 8, wherein the replicated hierarchal structure comprises a different advertisement element node option for at least one of the advertisement element nodes correlated to the basic unit.

10. The non-transitory computer storage media of claim 8, wherein the logic campaign is generated to comprise an advertisement element node option associated with a corresponding advertisement element node of the replicated hierarchal structure.

11. The non-transitory computer storage media of claim 8, further comprising segmenting an advertisement element node of the hierarchal structure into segmentation nodes, the segmentation nodes representing a logical categorization of an advertising element node option associated with the advertising element node being segmented.

12. The non-transitory computer storage media of claim 11, wherein segmenting the advertisement element node is performed prior to replicating the one or more advertisement element nodes.

13. The non-transitory computer storage media of claim 8, wherein the replicated hierarchal structure of the advertisement channel is generated by duplicating the hierarchal structure and changing an advertisement element node option associated with the one or more advertisement element nodes of the replication layer.

14. The non-transitory computer storage media of claim 13, wherein replicating the one or more advertisement element nodes comprises continuously replicating the hierarchal structure through all advertisement element node options for at least one advertisement element node.

15. The non-transitory computer storage media of claim 8, further comprising replicating at least one advertisement element node for each hierarchal structure associated with the plurality of different types of advertisement channels.

16. The non-transitory computer storage media of claim 8, further comprising modifying a value of the basic unit to apply a change to a value of a channel specific feature of the physical campaign of the physical layer.

17. A computerized method for integrating advertisement software platforms, the method comprising:

replicating, in an abstract layer of a computer program, one or more advertisement element nodes of a hierarchal structure for an advertisement channel to generate a replication layer, the hierarchal structure being generated based on at least one advertisement node, associated with the advertisement channel, correlating to a basic unit defined as common across a plurality of different types of advertisement channels by being correlated to advertisement element nodes of the plurality of different types of advertisement channels;

generating, based on replicating the one or more advertisement element nodes of the hierarchal structure, a logic campaign in the abstract layer, the logic campaign including the replication layer;

associating the logic campaign with a physical campaign of a physical layer of another computer program; and modifying the physical campaign of the physical layer by using the logic campaign and based on a modification of the basic unit within the abstract layer.

18. The method of claim 17, wherein the logic campaign includes a replicated hierarchal structure that includes the replication layer comprising a different advertisement element node option associated with the one or more advertisement element nodes.

19. The method of claim 17, further comprising segmenting advertisement element nodes of the hierarchal structure, each segmentation node associated with a segment that is a logical categorization of an advertisement element node option.

20. The method of claim 19, wherein the logical campaign comprises the advertisement element node option and the segment of a corresponding segmentation node.

* * * * *